Oct. 7, 1941.   J. W. McKERNON   2,258,023
FLOWMETER
Filed Nov. 1, 1939
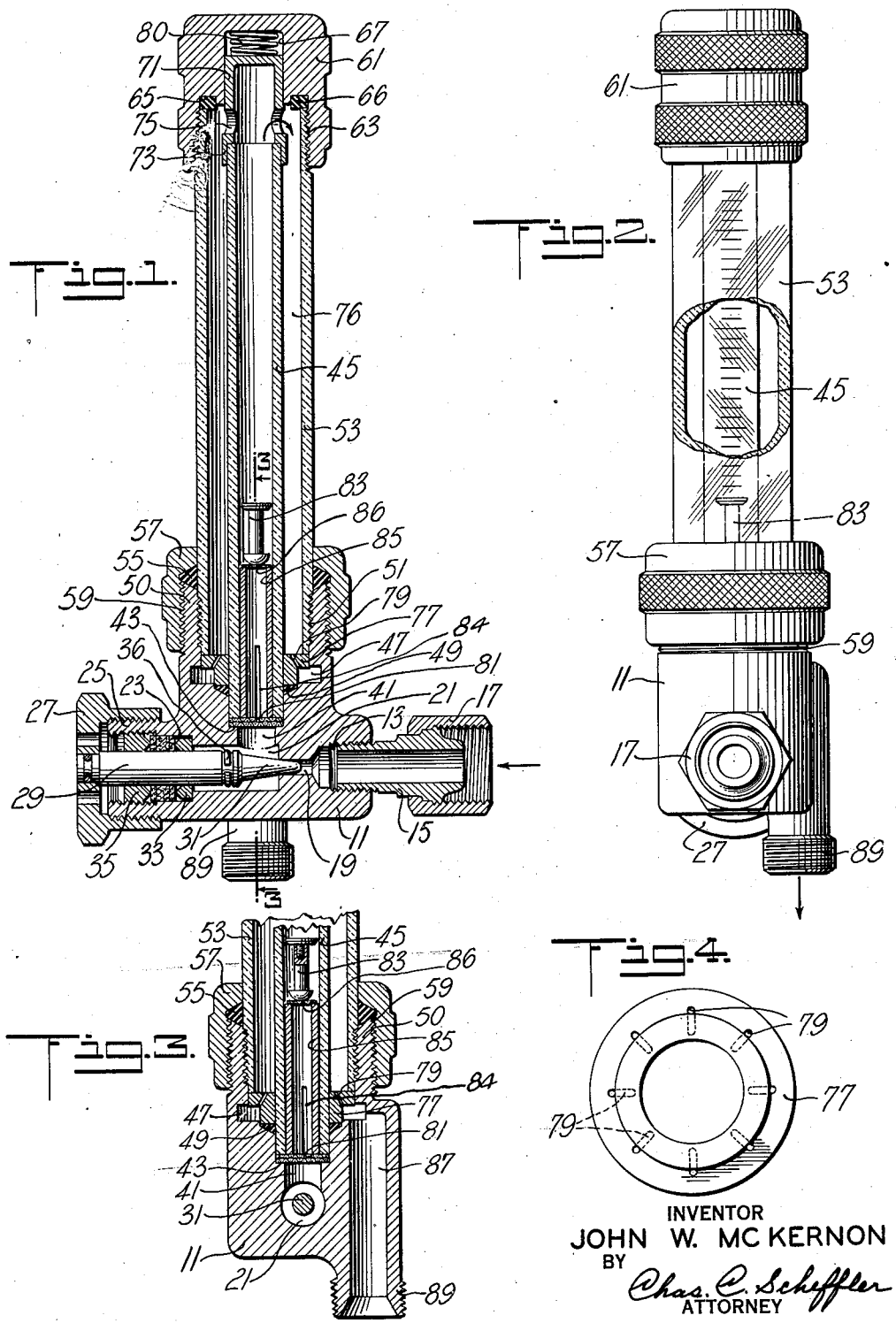
INVENTOR
JOHN W. MCKERNON
BY
Chas. C. Scheffler
ATTORNEY Patented Oct. 7, 1941

2,258,023

UNITED STATES PATENT OFFICE 2,258,023

FLOWMETER

John W. McKernon, New Canaan, Conn., assignor to Oxweld Acetylene Company, a corporation of West Virginia Application November 1, 1939, Serial No. 302,287

10 Claims. (Cl. 73—209)

This invention relates to flowmeters of the float-gauge type, and more especially it concerns flowmeters utilizing concentric tubes of transparent material. The flowmeter of the invention is designed to allow the free flow of fluid therethrough, even when the fluid is moving at rates far in excess of those which the flowmeter is calibrated to measure. It has especial utility for the flow control of oxygen in hospitals and factories using oxygen supplied through manifold systems, with supply lines delivering oxygen to various points throughout a building.

Among the more important objects of the invention are the following: to provide a sturdy flowmeter unit which controls the feed of oxygen or other fluid, and which renders unnecessary the use of pressure regulators in the feed line to the flowmeter; to provide for preventing injury to the float in the event of flow surges such, for example, as often occur when starting up processing units; to provide in novel manner for preventing sudden or uncontrolled eddy currents or non-uniform flow through the graduated gauge tube of the fluid being metered; to provide for permitting unobstructed flow of fluid through the meter when flow rates occur which are higher than those for which the gauge is calibrated; to provide a novel combination of flowmeter and needle valve; to provide a flow meter having means compensating for variations in the thermal expansion of the parts and thereby preventing injury to the tubular members and the float. These and other objects will be apparent as the description proceeds.

In the accompanying drawing illustrating one modification of the invention,

Fig. 1 is a vertical section through a flowmeter assembly;

Fig. 2 is a side elevation of the flowmeter shown in Fig. 1, viewed from the right in Fig. 1;

Fig. 3 is a fragmental section taken along the lines 3—3 of Fig. 1, looking in the direction of the arrows; and Fig. 4 is a view of packing gland and fluid distributing member.

Referring to the drawing, the float-gauge or flowmeter includes a metal body member or gauge base 11 of brass or other suitable material, which may be pressure forged, and which preferably is provided with a hard, smooth surface, as by chromium plating or other suitable means.

The member 11 has therein a fluid inlet passage 13 having a threaded wall portion adapted to cooperate with the threaded end of an inlet connection 15 of well-known type, having a coupling member 17 for connecting the same to a source of the fluid being metered. A small passage 19 establishes communication between inlet passage 13 and a larger passage 21 in alignment therewith. The latter is counterbored to provide a recessed portion 23. A boss 25 has thereon a threaded outer surface cooperating with the threaded surface of a valve wheel 27 secured to the stem 29 of a needle valve having a seating surface 31 cooperating with a seating surface in passage 19. A packing gland 33 and an adjustable threaded packing gland 35, with interposed packing, function in the usual manner. A split ring 36 of metal prevents accidental withdrawal of the stem 29 from the base.

The base 11 has a vertically-extending passage 41 in communication with passage 21, the passage 41 being counterbored to provide a ledge 43 forming a support for a calibrated metering tube 45 of a transparent material such as glass or a suitable condensation product or plastic. A second counterbore provides an annular recess or chamber 47 in the member 11, the wall between the recess 47 and ledge 43 having a tapered portion adapted to support a gasket 49 of soft rubber or other suitable material. The upper end 50 of the base 11 is counterbored to form a passage in communication with passage 41 and recess 47, the walls forming said passage being threaded at 51 to cooperate with the threaded outer margin of a heavy walled tube 53 of transparent material. Preferably the tube 53 is made of a suitable condensation product or plastic such as a methyl methacrylate resin; or a cellulose derivative; or other material capable of being shaped by machining operations.

The upper end of the base is bevelled downwardly and inwardly to house a gasket 55 of soft rubber or the like, which is interposed between it and a packing gland nut 57. The latter is threaded for cooperation with threads 59 on the outer upper margin of the base.

For supporting the upper margins of tubes 45 and 53, a retaining cap 61 of metal or other suitable material is provided, the said cap having formed therein,—by machining or other means,— a tube-housing recess 63; a gasket-housing recess 65; and a deep central tube-guide housing recess 67, spaced from recess 65. The walls of the cap forming the recess 63 are threaded to cooperate with the threaded upper end of the tube 53. A gasket 66 of soft rubber or the like is disposed in recess 65.

For supporting the calibrated tube 45 at its upper end and for guiding the latter during longitudinal movement of the latter due to expansion and contraction of the respective tubes, or during assembly of the flowmeter, a hollow tube guide or cap 71 is mounted for axial sliding movement in the recess 67. The interior of the cap 71 is of sufficient diameter to house the float 83 hereinafter described. The cap 71 has a flanged lower margin 73 adapted to house the upper end of the calibrated tube 45. A plurality of laterally-disposed apertures 75 in the guide 71 establish free communication between the interior of tube 45 and an annular space 76 formed between tubes 45 and 53. An annular gland and spacing member 77 snugly fits around tube 45, and is interposed between the lower end of tube 53 and gasket 49 which rests on a sloping midportion of the passage walls adjacent recess 47. A plurality of passages 79 establish communication between the recess 47 and the annular space 76 between the tubes.

For exerting a selected low pressure upon the upper end of tube 45 to hold the same securely in place, and to compensate far variations in the thermal expansions of the inner and outer tubes 45, 53, a coil spring 80 or other suitable cushioning member is operatively interposed between the bottom of the central recess 67 and the top of cap 71.

For distributing the fluid uniformly throughout the entire cross-section of the graduated tube under all conditions of flow there are provided at least one, and preferably five or six, fine-mesh metal screens 81, which are operatively interposed between the ledge 43 and the lower end of calibrated tube 45.

The inner walls of tube 45 taper slightly outwardly in an upward direction in well-known manner.

A float member 83 of any well-known design is disposed within the inner tube 45, the arrangement of parts being such that fluid entering the lower end of the calibrated tube 45, in passing therethrough, raises the float increasingly as the rate of flow of the fluid increases.

Preferably the float has a generally hemispherical lower portion; a shank portion; and an upper disc-shaped portion provided with inclined peripheral slits or spiral grooves functioning to cause the float or spinner 83 to rotate on its vertical axis during flow of fluid through tube 45.

For supporting the float 83 when not in operation, a tubular stop member 85 is mounted in the lower end of tube 45 and rests upon the uppermost screen 81, the stop member having a fine-mesh screen 86 secured to its upper end and being open at the other end. By providing longitudinal slots 84 in the member 85 at its lower end, the residual resilient metal fingers thus formed may be bent to pressingly engage the wall of tube 45 and anchor member 85 in place.

For withdrawing fluid flowing downwardly in the annular space 76, a passage 87 within the base 11 opens at one end into the recess 47. At the other end it extends within an externally-threaded annular boss 89 in member 11, adapted to be connected to a fluid discharge line (not shown).

During operation of the apparatus as an oxygen therapy flowmeter, oxygen enters the flowmeter at 15, and passes to the needle valve. The latter, or its equivalent, is designed to provide a very small change in cross-sectional area of the metering orifice for a large movement of the valve wheel 27, and closely controls the flow of oxygen to chamber 21. The oxygen then flows through screens 81 to the interior of the calibrated tapered tube 45, which may be graduated in terms of liters per minute. The oxygen flow raises float 83 to a height proportional to the rate of flow. Simultaneously therewith the float spins about its vertical axis, due to the spiral grooves in the periphery of the upper portion, thereby preventing wobbling and increasing its responsiveness to changes in flow rate. The oxygen then flows from tube 45 through passages 75 into passage 76, and thence through passages 79, recess 47 and passage 87 to the flowmeter outlet.

The construction and arrangement of parts hereinbefore described are such that, in instances where the inlet valve is rapidly and fully opened, whereby the float member 83 may be forced upwardly at a relatively high velocity and strike the upper end of the tube guide 71, the shock thus imparted is substantially entirely absorbed by the spring 80, and thus is not transmitted to the other parts of the flowmeter.

When using the flowmeter for supplying oxygen to an oxygen tent, it is desirable to fully open the control valve in order to purge the tent as quickly as possible. The present apparatus is especially adapted to facilitate this. Thus the interior of the guide member 71 is made sufficiently large to accommodate the float 83 when such excess pressure and increased flow rates are applied. Consequently at such times, the float rises quickly above the ports 75, thereby preventing all impedance of the maximum flow of oxygen. Undue shock or injury to the float in the event of sudden rise and impacting of the latter upon the guide member 71 due to flow surges in the fluid lines is prevented by the cushioning effect of the spring 80 or equivalent cushioning member.

The flowmeter may quickly be disassembled when desired for cleaning or replacing the screens 81, or for other purposes.

Upon removing the cap 61 and the gland nut 57, the outer tube may be removed. The inner tube and associated parts then may be readily removed. For replacement of the calibrated tube 45, it is only necessary to remove the cap 61 and guide 71 and loosen nut 57 and tube 53, whereupon the tube 45 and float 83 may be removed.

The invention is susceptible of modification within the scope of the appended claims.

I claim:

1. A flowmeter of the float-gauge type, comprising a base having a fluid inlet therein; concentric spaced transparent tubes carried by said base and including an outer tube secured to said base, and an inner calibrated gauge tube having a tapered inner wall; a fluid-tight cap sealing the upper end of said outer tube; a tube guide and housing contacting the upper end of said inner tube and slidable in said cap, said guide having apertures therein establishing communication between the interior of said inner tube and an annular space between said outer and inner tube, a fluid outlet in communication with said annular space, yielding means operatively interposed between said fluid-tight cap and said tube guide and adapted pressingly to urge said inner tube against said base, and a float member within said inner tube.

2. A flowmeter as defined in claim 1, wherein the said tube guide is hollow and is adapted to house said float and prevent obstruction by the latter of the free flow of fluid from said inner tube to said annular space at high flow rates.

3. A flowmeter as defined in claim 1, together with at least one fine-mesh screen interposed between said fluid inlet, and the inlet of said inner tube, and means for maintaining the float member at all times in spaced relation to said screen.

4. A flowmeter as defined in claim 1, together with a needle-type valve mounted in said base and controlling communication between said fluid inlet and the interior of said inner tube, a fluid-distributing screen disposed adjacent the outlet of said valve, and means operatively interposed between said float member and said screen for maintaining the former in spaced relation to the latter.

5. A flowmeter as defined in claim 1, together with means interposed between said outer tube and said base and surrounding the lower end of said inner tube, said means including an apertured annular gland and spacing member interposed between said outer tube and said inner tube, and a resilient gasket disposed between said base and said spacing member.

6. A flowmeter of the float-gauge type, which comprises a base having a fluid inlet and a fluid outlet, a pair of concentric transparent tubes supported on said base, the innermost tube having tapered inner walls and having its interior in communication with said fluid inlet, means for securing the outermost tube to said base, means connecting the annular space between the respective tubes with the fluid outlet, a fluid-tight cap secured to said outer tube, apertured guide means operatively interposed between said cap and the upper end of said inner tube and movable in a direction longitudinally of said inner tube, said guide means establishing communication between the interior of said inner tube and the annular space between the tubes while maintaining the respective tubes in concentric relation, and cushioning means interposed between said cap and said guide means.

7. A flowmeter as defined in claim 1, together with a screen, and means for maintaining the float member at all times in spaced relation to said screen.

8. A flowmeter as defined in claim 1, together with a screen, and means for maintaining the float member at all times in spaced relation to said screen, said last-named means having portions adapted pressingly to engage the wall of said inner tube and anchor said last-named means in place.

9. A flowmeter of the float-gauge type, comprising a base having a fluid inlet and a fluid outlet; an inner transparent tube supported upon said base, said tube having tapered side walls and having its interior in communication with said fluid inlet; an outer transparent tube surrounding the walls of said inner tube and supported on said base; means connecting the annular space between the respective tubes with said fluid outlet; a fluid-tight cap secured to said outer tube; apertured guide means operatively interposed between said cap and the upper end of said inner tube, and movable in a direction longitudinally of said inner tube, said guide means establishing communication between the interior of said inner tube and the annular space between the tubes, while maintaining the respective tubes in spaced relation; and cushioning means operatively interposed between said cap and said guide means.

10. A flowmeter of the float-gauge type, comprising a base having a fluid inlet and a fluid outlet; an inner transparent tube supported upon said base, said tube having tapered side walls and having its interior in communication with said fluid inlet; a float member within said inner tube; an outer transparent tube surrounding the walls of the inner tube and supported on said base; means connecting the annular space between the respective tubes with said fluid outlet; a fluid-tight cap secured to said outer tube; apertured guide means operatively interposed between said cap and the upper end of said inner tube, and movable in a direction longitudinally of said inner tube, said guide means establishing communication between the interior of said inner tube and the annular space between the tubes while maintaining the respective tubes in spaced relation; and means operatively associated with said guide means for cushioning said cap and associated parts against the shock of impact of the float member transmitted by said guide means.

JOHN W. McKERNON.